United States Patent [19]

Langston

[11] Patent Number: 4,757,976
[45] Date of Patent: Jul. 19, 1988

[54] APPARATUS FOR PULLING MULTIPLE RUNS OF FIBER OPTIC CABLE

[76] Inventor: Ralph C. Langston, 13588 SE. 152nd Ave., Clackamas, Oreg. 97015

[21] Appl. No.: 56,490

[22] Filed: Jun. 1, 1987

Related U.S. Application Data

[60] Continuation-in-part of Ser. No. 818,117, Jan. 10, 1986, Pat. No. 4,669,705, which is a division of Ser. No. 648,757, Sep. 7, 1984, Pat. No. 4,576,362.

[51] Int. Cl.[4] .............................................. E21C 29/16
[52] U.S. Cl. ......................................... 254/134.3 FT
[58] Field of Search ............ 254/134.3 FT, 134.3 PA, 254/134.3 R; 242/86.5, 86.7

[56] References Cited

U.S. PATENT DOCUMENTS

| | | |
|---|---|---|
| 3,143,309 | 8/1964 | Clarke . |
| 3,190,616 | 1/1965 | Oleson . |
| 4,039,141 | 8/1977 | Lindsey ..................... 254/134.3 PA |
| 4,270,734 | 6/1981 | Straight . |
| 4,372,535 | 2/1983 | Gibson et al. . |
| 4,454,999 | 6/1984 | Woodruff ................... 254/134.3 FT |
| 4,456,225 | 6/1984 | Lucas ........................... 254/134.3 R |
| 4,468,003 | 8/1984 | Nonclercq et al. . |
| 4,469,306 | 9/1984 | Wimer et al. ............... 254/134.3 FT |
| 4,482,133 | 11/1984 | Bishop . |
| 4,502,666 | 3/1985 | Mattelon et al. . |
| 4,508,281 | 4/1985 | Plater . |

FOREIGN PATENT DOCUMENTS 2037693 7/1980 United Kingdom ......... 254/134.3 R

OTHER PUBLICATIONS

Inferring Duct-Run Geometry from Cable-Tension Data: A Case History, A. L. Hale, Bell Labs, Whippany, N.J. and M. R. Santana, Bell Labs, Norcross, GA—Proceedings of the 25th International Wire and Cable Symposium, Nov. 16, 17, and 18, 1976, Cherry Hill, N.J.
Parke Thompson Associates, Introductory Price Sheet—No. 8967, dated Jan. 1, 1967.
AT&T Informational Letter, dated Sep. 28, 1978.
Field Experience with Fiber-Optic Cable Installation, Splicing, Reliability and Maintenance, Otto I. Szentesi, IEEE Journal on Selected Areas in Communications, Apr. 1983.

Primary Examiner—Robert C. Watson
Attorney, Agent, or Firm—Marger & Johnson

[57] ABSTRACT

A fiber optic cable pulling method and apparatus includes a series of large-diameter capstan winches placed at intermediate access points along the conduit through which the fiber optic cable is to be pulled. Each capstan winch pulls a portion of the cable through a segment of the conduit at a substantially uniform velocity. The capstan wheel of each winch is sized frictionally to engage the cable without exceeding its minimum bending radius. The winches are independently controlled by controllers which limit the rate of hydraulic fluid and its pressure flowing to the hydraulically powered winch, and thereby maintain pulling tension on each portion of the cable below a predetermined tension, if exceeded, which could damage the fiber optics in the cable. The capstan winches are spaced sufficiently close together so that the pulling tension necessary to pull a portion of cable through each conduit segment is ordinarily less than the tension provided by the capstan winches. If a portion of the cable catches in a segment of conduit, the winches cease pulling along the entire length of the cable.

14 Claims, 13 Drawing Sheets

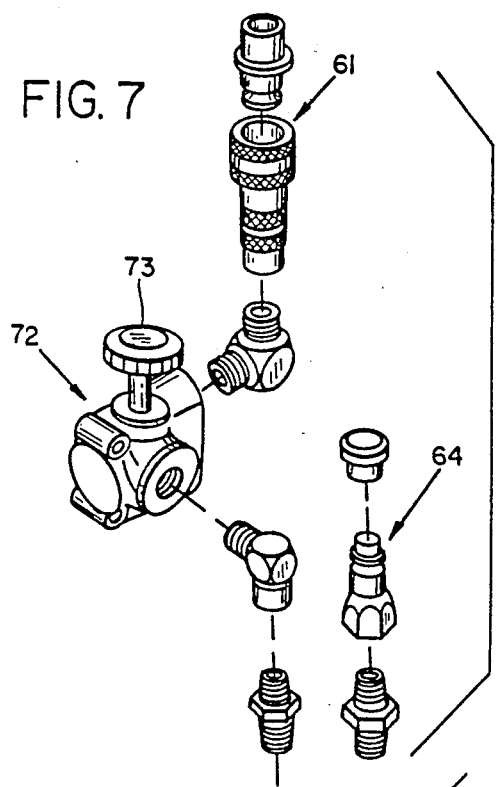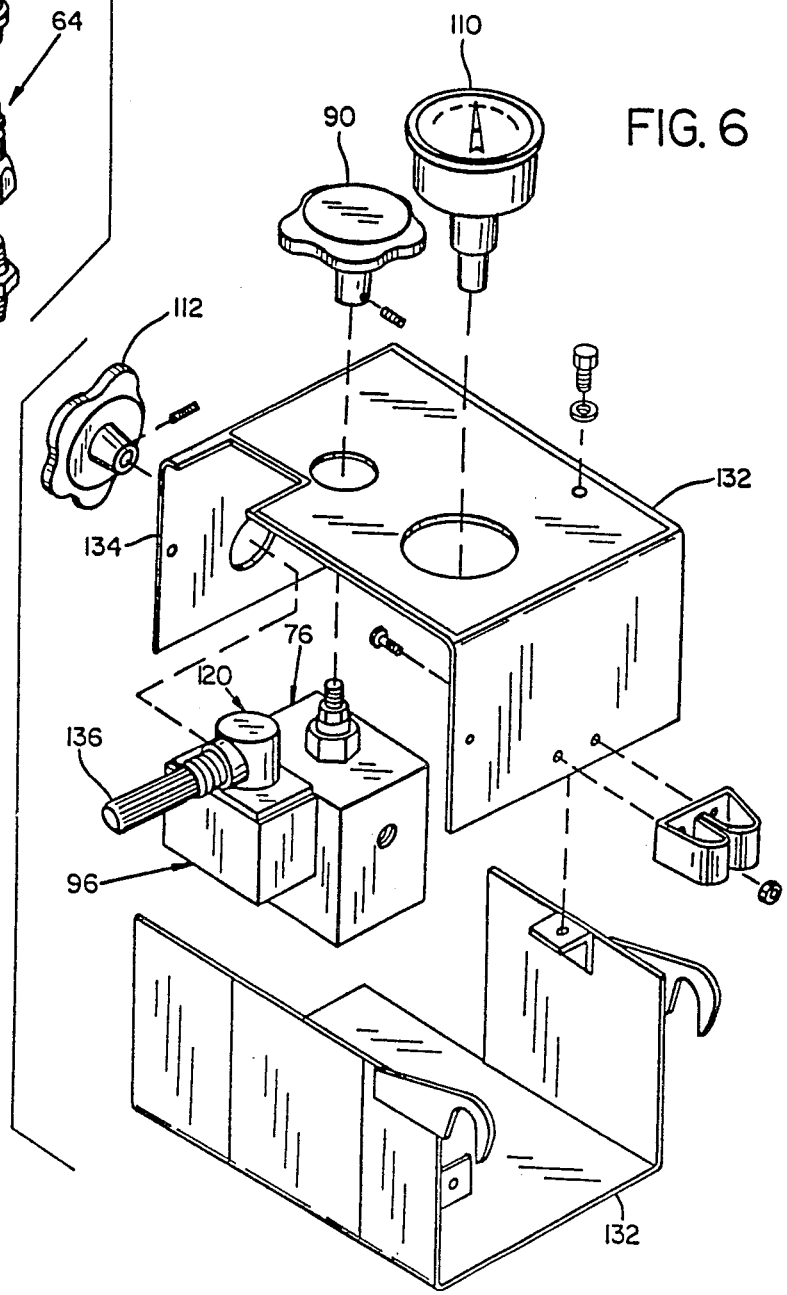

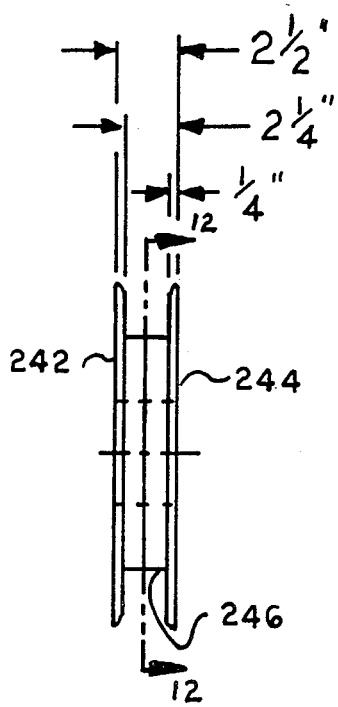
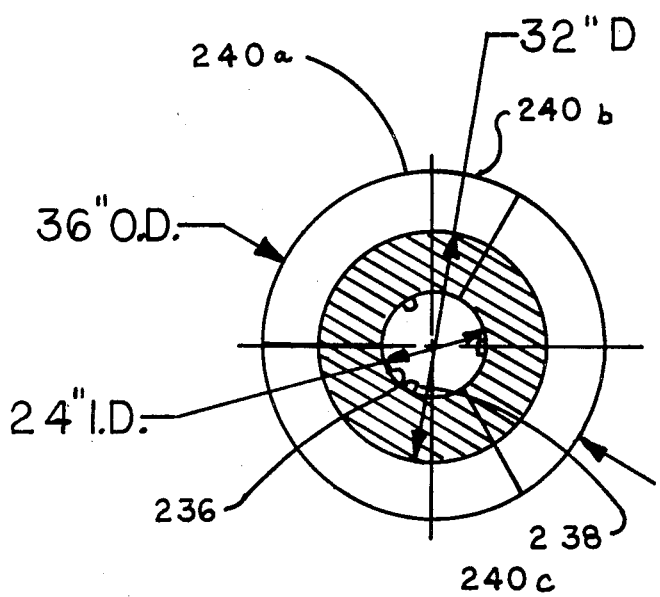
FIG. 11  FIG. 12
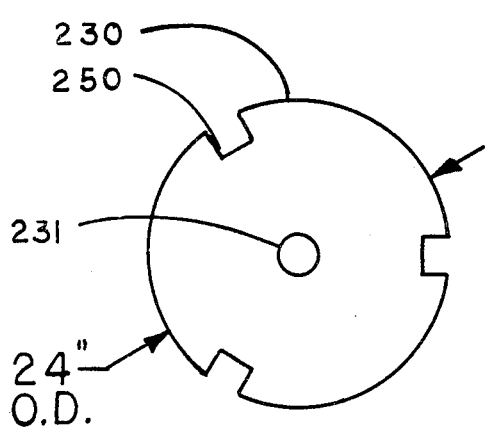
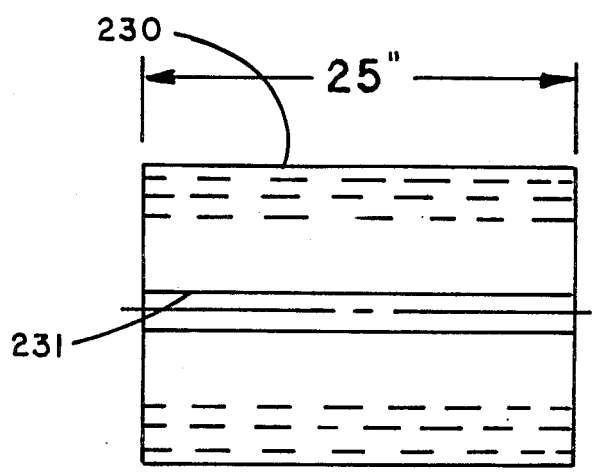
FIG. 14  FIG. 13

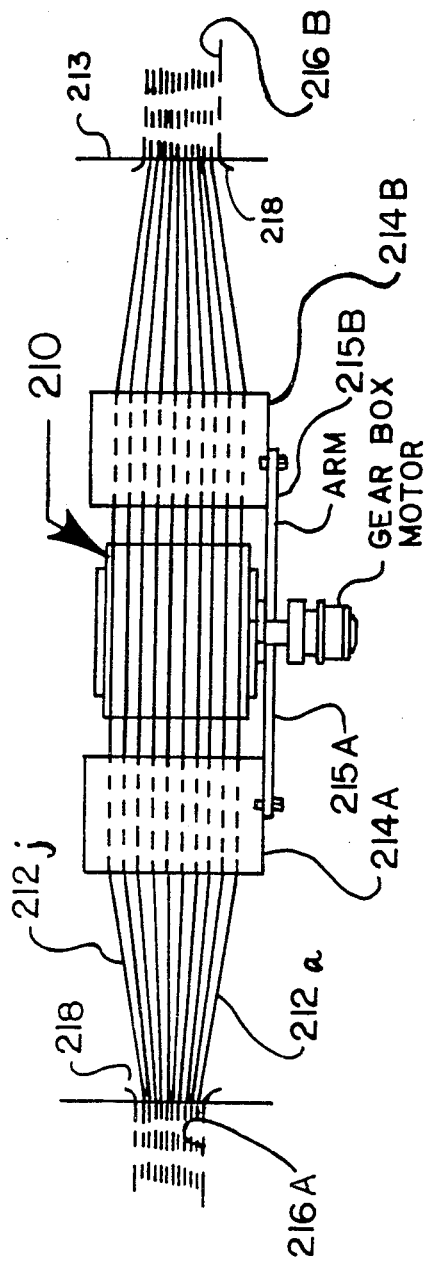
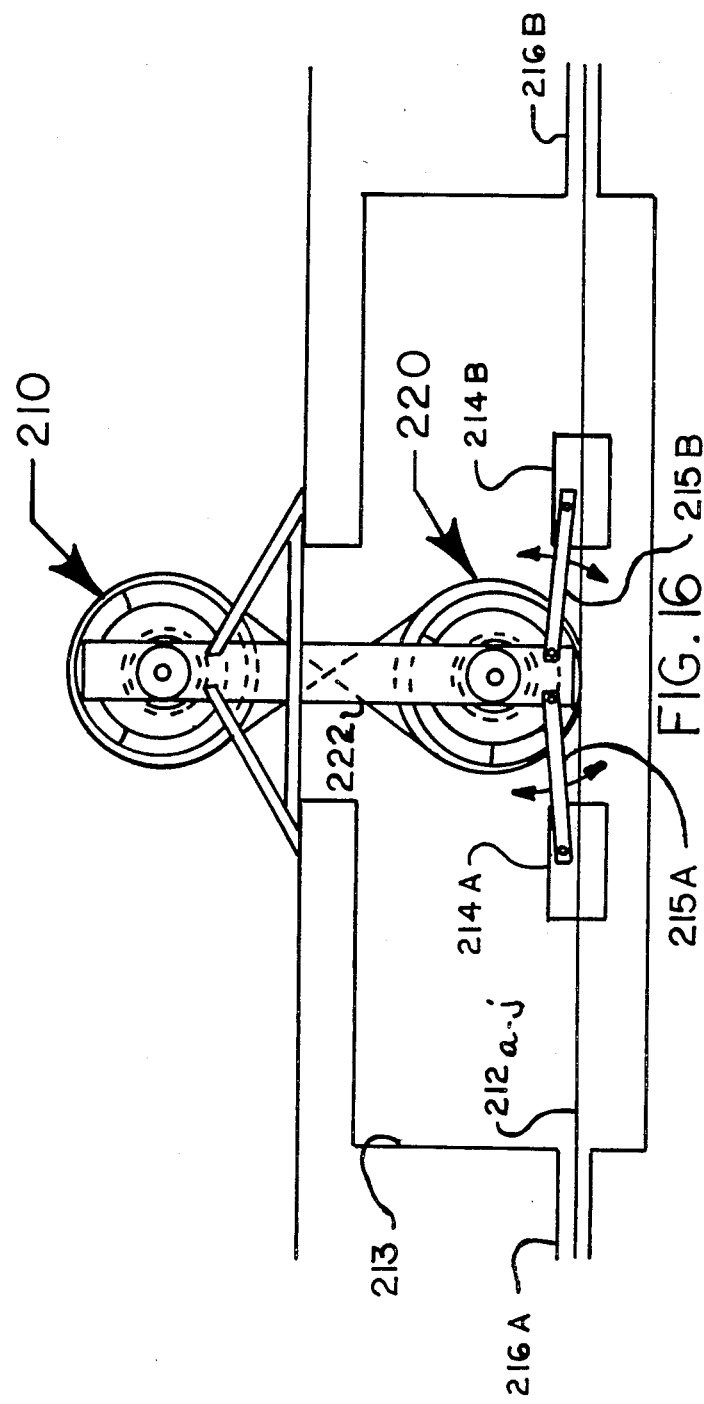

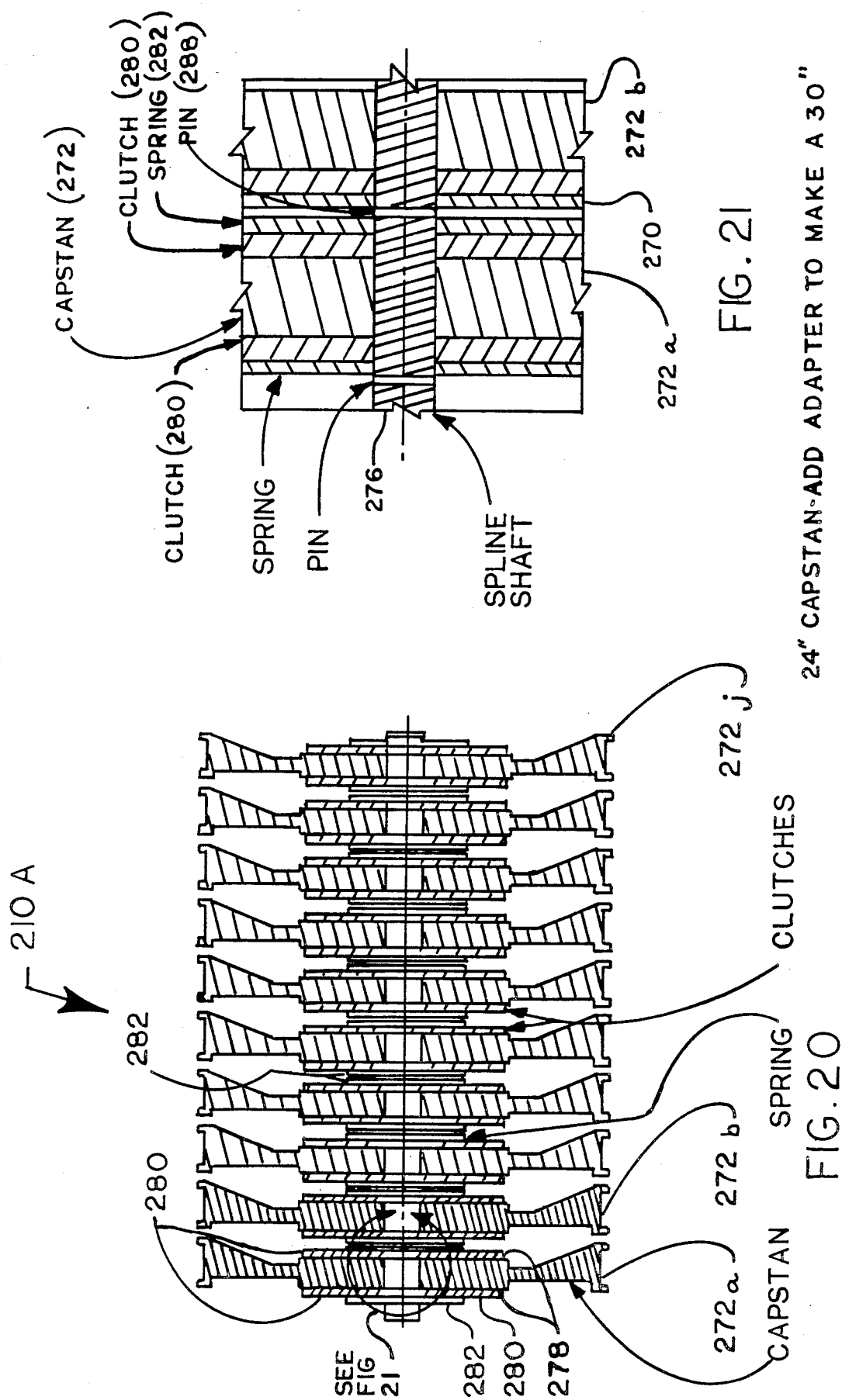

APPARATUS FOR PULLING MULTIPLE RUNS OF FIBER OPTIC CABLE

This application is a continuation-in-part of my copending application Ser. No. 818,117, filed Jan. 10, 1986, now U.S. Pat. No. 4,669,705, issued June 2, 1987; which is a divisional of prior application Ser. No. 648,757, filed Sept. 7, 1984, now U.S. Pat. No. 4,576,362, issued Mar. 18, 1986.

BACKGROUND OF THE INVENTION

This invention relates to a method and apparatus for laying underground cable and more particularly to pulling long runs of fiber optic cable through underground conduit.

Fiber optic cable is composed of a bundle of long, thin fibers of glass, plastic or other transparent material, closed within a protective sheath. Encoded light pulses carrying audio and video signals are sent through the fiber much like electric current travels along a wire. The advantage of fiber optic cable over conventional cable lies in its transmission characteristics. Because of the fiber's thinness and superior attenuation characteristics, a fiber optic cable can carry a much higher rate of information over many more channels than a comparably sized wire cable.

However, fiber optic cable is more difficult to lay than conventional cable. It lacks the tensional strength of conventional wire cable and will fracture at a much lower pulling tension. Furthermore, because of its construction, fiber optic cable is relatively inflexible. Typically, the fibers are bundled in a spiral fashion around a stiff steel support wire within a hard plastic protective sheath. Bending of the cable beyond a limited range can break the fibers within.

Because of these material drawbacks, conventional pulling methods and apparatus have proven inadequate for pulling more than a relatively short length of fiber optic cable through an underground conduit. These methods usually comprise placing a single winch at the conduit exit, passing a pull rope attached to the fiber optic cable through the conduit to the winch, and operating the winch to pull the rope and cable through the conduit until the rope is completely wound on the winch and the cable reaches the conduit exit. Pulling a cable in such a manner requires considerable tension to overcome the frictional drag of the cable along the conduit surface. The winch pulling tension necessary to overcome this drag quickly increases as the length of pull increases. Typically, no more than 2,000 feet of cable can be pulled before the winch tension exceeds the cable's tensional limit. (However, the length of pull varies with the condition of the conduit.) In contrast, many times that length of wire cable can be pulled without the cable breaking.

The extra pulling requires more time and manpower in moving the winches and setting up the apparatus. Moreover, connecting the relatively short lengths of fiber optic cable adds substantial additional cost to installation of the cable. Each connection demands expensive and time-consuming splicing. The extra splicing in turn creates resistance to the transmitted light pulses which must be overcome by the installation of additional signal repeaters along the cable to boost the signal strength.

To increase the maximum continuous length of fiber optic cable which may be pulled, several techniques have been developed. In one approach, a tensiometer is incorporated into the conventional winch to limit the pulling torque of the winch to an amount below the tensional strength of the fiber optic cable. The winch ceases to pull if the tension needed to pull the cable through the conduit exceeds the preset torque limit of the winch. If the cable is between conduit access points at the time the winch stops, it is withdrawn until its ends rest at an access point. A new section of cable is then inserted and the process repeated. Although this technique assures the winch will not pull the cable with excessive tension, it is little more than a fine tuning of the conventional pulling method and does not significantly increase the pulling length of cable.

A second technique doubles the continuous length of cable that can be pulled by pulling the cable from both ends of its storage spool, one end in each direction. With the spool positioned at an intermediate access point in the conduit, one end of the cable is pulled in one direction and the other end is pulled in the opposite direction. Under typical conditions, the length of pull is about 4,000 feet.

A third approach encompasses a series of pulls and stores which further increase the pulling length. The cable is first pulled from its storage spool at an intermediate conduit access point 2,000 feet from an entry point of access to the conduit. Rather than stopping at that point where the cable reaches the winch, however, the cable is manually pulled out of the conduit until an additional 2,000 feet are pulled through the conduit. As the cable emerges from the conduit, it is stored on the ground in a FIG. 8 pattern sufficiently sized to avoid unduly bending the cable. After 2,000 feet are stored aboveground, the cable end is then reinserted into the conduit, and the stored cable is pulled to another access point. At the spool, a third 2,000-foot length is spooled off into another figure 8 pattern on the ground. The cable is then severed from the spool, its end inserted into the conduit, and the stored cable is pulled in the opposite direction to a third access point. In this way a 6,000-foot run of fiber optic cable can be pulled into a conduit with splicing.

These methods of pulling fiber optic cable, although improvements over the conventional pulling method, can lay but relatively short lengths of cable. Only with the third approach is it possible to pull significantly longer lengths, but the labor cost of handling, storing, and pulling soon outweigh the benefit of an additional increment of length. And all of these methods still require significantly more splices and signal repeaters than are required in pulling wire cable.

Accordingly, the need remains for a method and apparatus for pulling long runs of fiber optic cable quickly and efficiently.

SUMMARY OF THE INVENTION

An object therefore of the present invention is to improve the pulling of long continuous runs of fiber optic cable through an underground conduit without the drawbacks of prior cable-pulling techniques.

A second object is to minimize the need for splicing and signal repeaters in laying long runs of fiber optic cable.

A third object is to minimize the labor required to lay continuous long runs of fiber optic cable.

Another object is to provide an inexpensive and reliable apparatus for pulling fiber optic cable in underground conduit that is easily installed and operated.

A further object is to pull fiber optic cable through underground conduit without unduly bending the cable or exceeding its tensional breakage limits.

The present invention is a method and apparatus for pulling a long run (e.g., 10,000 meters or more) of fiber optic cable through underground conduits in a continuous unbroken length from a conduit entry to a conduit exit. Under the method, a spool of the fiber optic cable is first placed at the conduit entry. At one or more selected intermediate access points spaced along the conduit, a capstan winch means is aligned with the conduit for pulling the cable therethrough. The capstan winch means is designed and operated to pull the cable at a predetermined velocity and tension. At a conduit exit, a second or rope pulling means, which can be another of the foregoing capstan winch means, is placed for pulling a pull rope attached to the cable to the exit and preferably directing it out of the conduit to the surface. With the winches and rope-pulling means in place, a conventional pull rope is extended in conventional fashion from the conduit entry through the conduit to the conduit exit, passing through each intermediate access point. The rope is connected to the lead end of the fiber optic cable at the conduit entry and to the rope-pulling means at the exit. The rope is then mounted on each capstan and pulled taut. To pull the cable, the capstan winch means and the rope-pulling means are operated simultaneously to pull the cable continuously along its length from the conduit entry through the conduit to the exit at a substantially uniform velocity and at a tension in each conduit segment not exceeding a predetermined amount.

The capstan winch means are spaced sufficiently close together along the length of the conduit to limit the tension applied to each length of the cable as it is relayed through the conduit to an amount below its damage threshold. To allow for optimum placement at the access points, each capstan winch means is independently driven and controlled. Each capstan winch means includes a large diameter wheel or drum around which the rope and cable wind as they are pulled through the conduit at a predetermined rotational velocity and at a maximum pulling torque. Each wheel is sized to a radius not less than the minimum bending radius of the fiber optic cable.

In a preferred embodiment, the capstan winch comprises a gear reduction mechanism driven by a hydraulic motor, the mechanism supportedly mounted to a capstan mounting bracket. A shaft of the gear mechanism extends through the bracket to mount a flanged narrow width, large diameter wheel defining the capstan. The hydraulic motor is operatively connected to the gear mechanism through a series of sprockets and connecting chain. Operation of the hydraulic motor is controlled by a separate controller which directs the hydraulic flow, permitting the capstan winch to pull in either direction or to shut off. The controller includes means for limiting the flow of hydraulic fluid to the hydraulic motor and thereby controlling the rate at which the capstan winch pulls the cable. The controller also includes means for limiting the pressure of the hydraulic flow to the hydraulic motor. By controlling the fluid pressure, the pulling torque of the capstan can be controlled and limited to an amount below that which will damage the fiber optic cable. The gear reduction mechanism is proportioned to the capstan to provide a low circumferential pulling speed and the resultant increased torque is controlled by the controller.

The present invention offers significant advantages over conventional pulling techniques. The series of capstan winches placed at intermediate access points along the conduit limit the tension on the cable in each conduit segment to an amount below its damage threshold. With such a system, great lengths of cable may be pulled without the need for frequent splicing or additional signal repeaters to overcome the resistance of the splices. Pulling the cable requires much less manpower and time than by conventional methods. Risk of damage to the cable is minimized by each capstan winch means pulling, in effect, only a short length (e.g., 2,000 foot) of a much longer, continuous cable. If the cable hangs up in one portion of the conduit, the downstream winch means ceases pulling when torque exceeds the limit preset below the damage threshold of the cable. The upstream capstan winch means also ceases pulling cable when the downstream tension is relieved, but continues to turn. This effect makes it easy for workers to determine easily in which portion of the conduit the cable has hung up.

An alternative embodiment of the invention enables multiple runs of fiber optic cable to be pulled simultaneously, with the benefits of the invention as above described with minimum risk of the multiple runs of cable becoming entangled as they are relayed through each intermediate access point. In the alternative embodiment, a notched or splined drum is provided on the output shaft of the drive means. The drum is an axial length sufficient to receive a plurality of flanged narrow width, large diameter wheels, the wheels being keyed or splined in a manner complementary to the shaft. The wheels are formed with an axial width sufficient for one or two wraps of the cable around each wheel. One wheel is provided for each cable to be pulled. A multiple cable guide means is provided adjacent the periphery of the wheels for guiding and positioning the cables at a predetermined spacing corresponding to the axial spacing of the cable on the wheels. Two such guiding means can be used, one on the upstream and the other on the downstream side of the capstan winch means. The guiding means is preferably mounted on an arm connected to a bracket supporting the capstan winch means and positioned so that the guiding means guides the cable along a path tangential to the wheels and aligned with the conduits. Preferably, the wheels are formed in angular segments, for example, three equal segments, interconnected by means, such as bolts, which enable the wheels to be disassembled so that they can be readily inserted through a manhole opening of a size smaller than the diameter of the wheels.

In a variation of the foregoing alternative embodiment, the wheels are connected to the shaft in such a way that individual wheels can turn separately from the other wheels when the tension on an individual wheel exceeds a predetermined maximum. The wheels themselves are mounted to turn freely on the drum. A series of clutches are mounted on the shaft between each of the wheels and splined to the shaft to turn therewith. A spring means is provided in association with each clutch for urging the clutch axially of the shaft into frictional engagement with its respective capstan wheel. The spring means is calibrated to provide a predetermined frictional engagement force between the clutch and the wheel such that the wheel turns with the shaft so long as the extreme tension on its respective capable remains below a predetermined maximum tension but slips when that maximum tension is exceeded.

A second alternative embodiment of the invention provides an alternative means for supporting each capstan winch within a manhole. Instead of a free standing bracket, a capstan winch means according to the invention is mounted on the extensible boom which is, in turn, mounted on a service truck so that it can be lowered into a manhole and supported by the truck for operation. The capstan winch means is preferably connected to the extensible boom by a hinge means which enables the capstan wheel to be positiond either vertically or on its side, and swivel means that enables the capstan wheel to be positioned angularly about a longitudinal axis of the boom. Mounting means is provided atop the service truck for slidably mounting the boom in a resting position atop the truck for transport and slidably moving the boom toward the rear of the truck to pivot downward into a working position. Preferably, the sliding mounting means is also horizontally slidable for positioning the boom and capstan winch means transversely of the truck.

The foregoing and other objects, features, and advantages of the invention will become more apparent from the following detailed description of a preferred embodiment which proceeds with reference to the accompanying drawings.

BRIEF DESCRIPTION OF THE DRAWINGS

FIG. 6 is an exploded view of the capstan winch controller of FIG. 5.

FIG. 7 is an exploded view of a cutoff valve and fittings for delivering fluid to the hydraulic motor in the circuit of FIG. 5.

FIG. 11 is a side view of a single wheel of the type used in the winch of FIG. 8.

FIG. 12 is a cross-sectional view taken along lines 12—12 in FIG. 11.

FIG. 13 is a side elevational view of the keyed drum used to support the wheels of the winch of FIG. 8.

FIG. 14 is an axial end view of the drum of FIG. 13.

FIG. 15 is a top plan view of the capstan winch of FIG. 8 as positioned in a manhole for pulling multiple runs of fiber optic cable in accordance with the invention.

FIG. 16 is a side elevational view of an alternate arrangement of the apparatus of FIG. 15.

FIGS. 19A and 19B are isometric views of a spring for tensioning the clutch mechanism in the apparatus of FIG. 19.

FIG. 20 is a cross-sectional view taken along lines 20—20 in FIG. 19.

FIG. 21 is an enlarged view of a portion of FIG. 20.

DETAILED DESCRIPTION

General Arrangement

Figure 1:
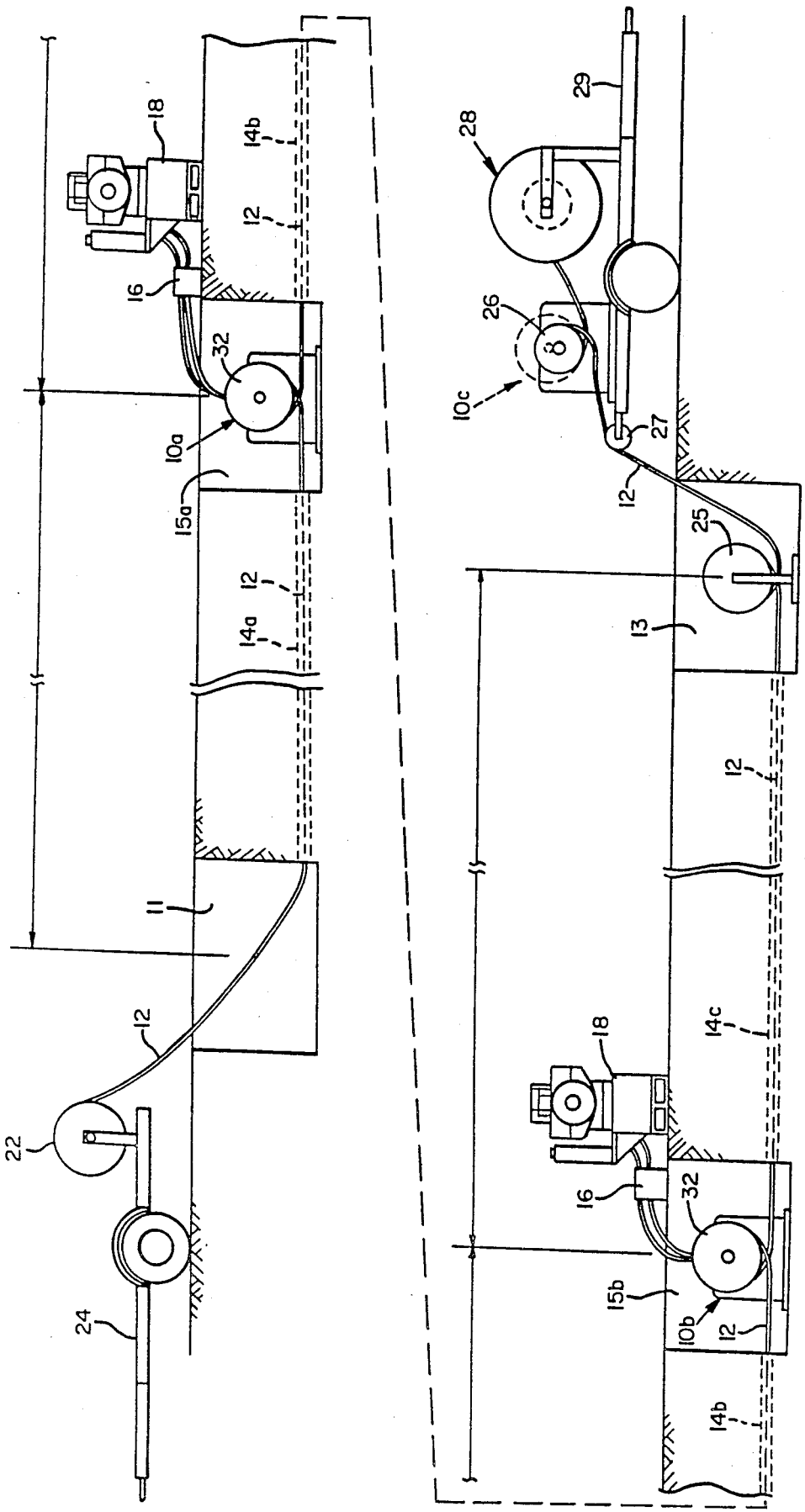
FIG. 1 is a schematic view of a system in accordance with the invention for pulling fiber optic cable through an underground conduit.

Referring to FIG. 1, the invention includes a series of capstan winches 10a, 10b for pulling a continuous fiber optic cable 12 through an underground conduit 14 from an entry point or manhole 11 to an exit point or manhole 13. Winches 10 are placed within selected intermediate access points or manholes 15a, 15b. The intermediate manholes are spaced closely enough together along segments 14a, 14b, 14c of the conduit that the pulling torque of each winch 10 necessary to pull the cable through each segment is below the tensional damage threshold of the cable. In general, the spacing varies inversely with the frictional resistance of the cable within each conduit segment. Under most conditions, the access points should be spaced about 2,000 feet apart.

The cable 12 is fed into the conduit 14 from above ground at the entry manhole 11 and pulled from the conduit at the exit manhole 13. A storage spool 22 from which the cable is wound is positioned beside entry point 11 on a trailer or truck 24 or other mobile support means. At conduit exit 13, a bull wheel 25 or other alignment means is placed within the manhole to relay the cable 12 upward as it is pulled through and out of the conduit 14 by a conventional rope winch 26 mounted between an idler roller 27 and a take-up reel 28 on a second trailer or truck 29 adjacent the exit point 13. Alternatively, if the fiber optic cable is to be spooled onto the take-up reel, a capstan winch 10c can be used instead of winch 26c.

Figure 5:
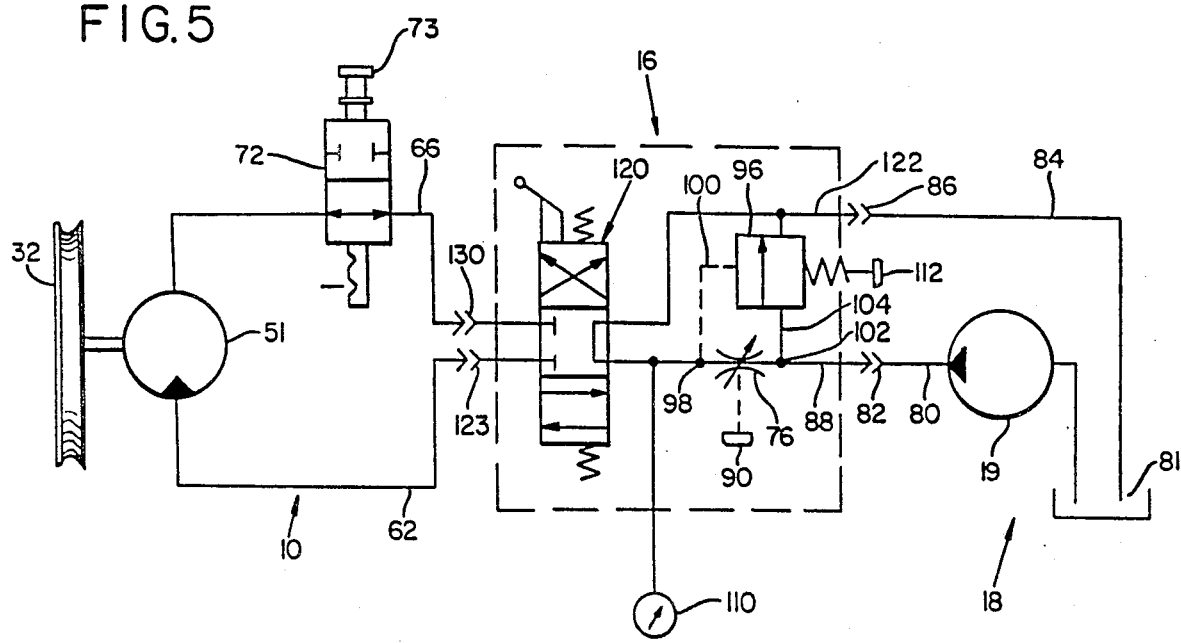
FIG. 5 is a schematic view of the controller, hydraulic pump, and fluid circuit for driving the hydraulic motor of the capstan winch of FIGS. 1 and 4.

Each capstan winch 10 is powered independently to permit their placement at optimally spaced intermediate manholes 15. The winches 10a, 10b are each separately controlled by controllers 16 which operate so as to pull the cable at a substantially uniform velocity through the conduit at up to a predetermined tension set below the tensional limit of the cable. Separate hydraulic power units 18 power each winch 10. Each power unit includes a motor- or engine-driven hydraulic pump 19 (FIG. 5).

The series of winches 10 pulls the cable 12 and winch 26 pulls the rope at several points along the conduit 14 simultaneously. By pulling sections of cable in this manner, a continuous cable of great length can be pulled. How the winches operate will be described below.

The Capstan Winch

Figure 2:
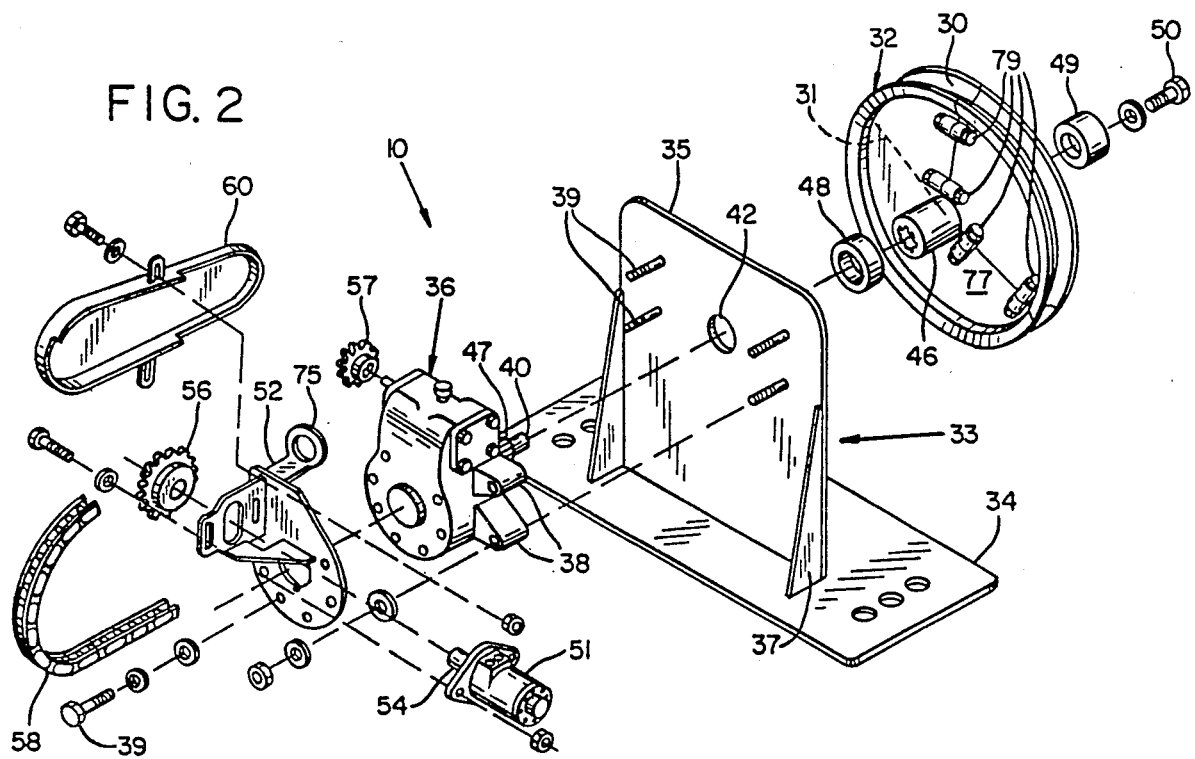
FIG. 2 is an exploded view of a capstan winch used in the system of FIG. 1.
Figure 3:
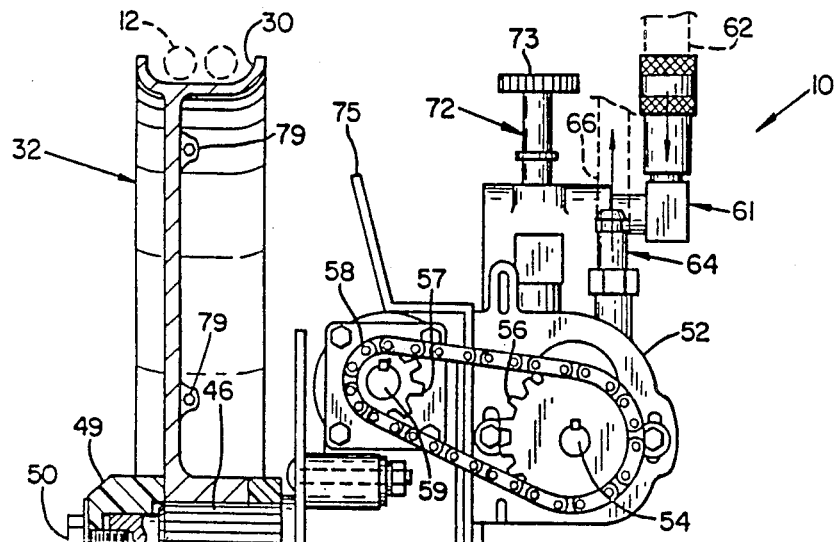
FIG. 3 is a side elevational view of the capstan winch of FIG. 2, with the capstan shown in cross section.
Figure 4:
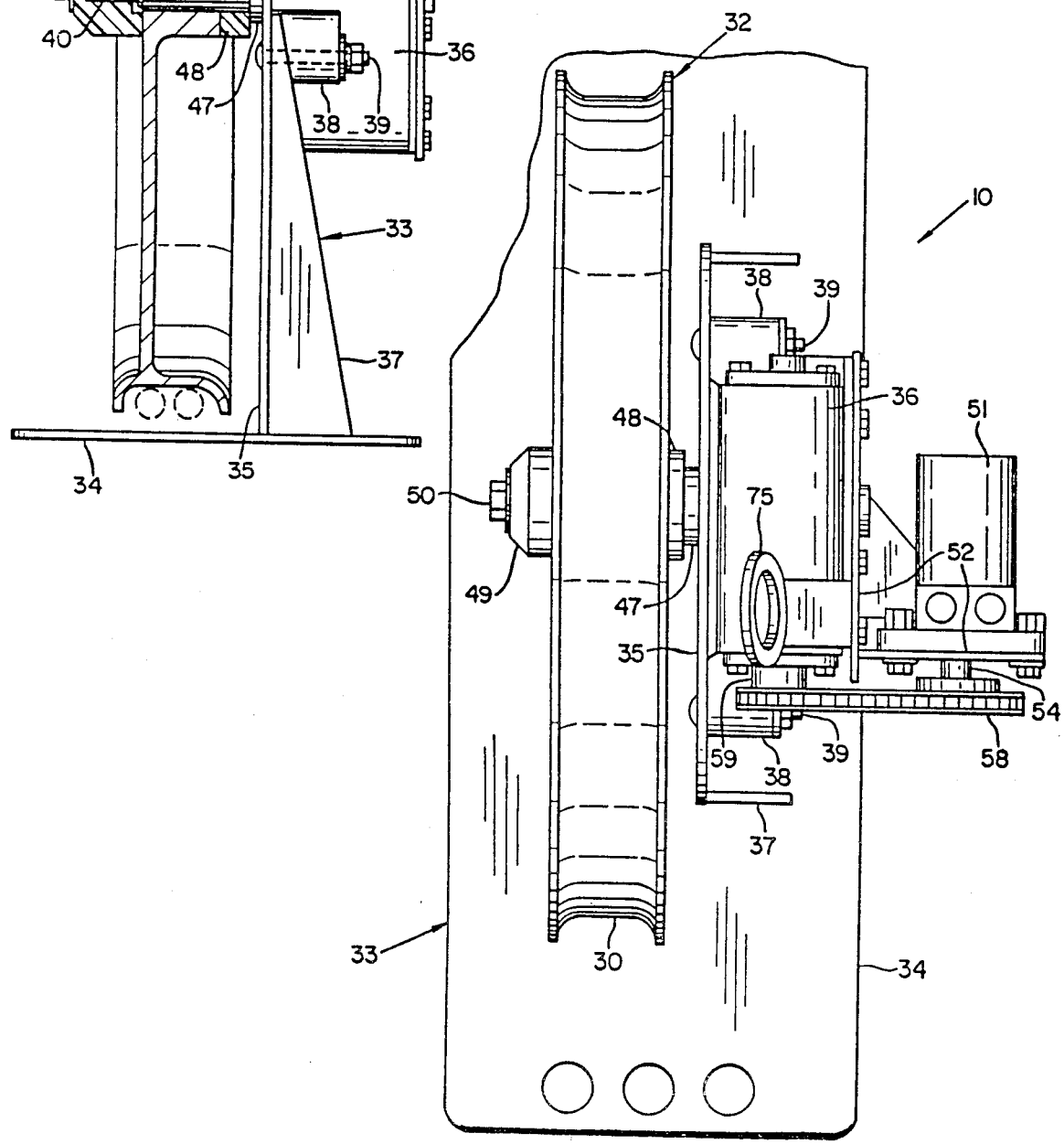
FIG. 4 is a top plan view of the capstan winch.

Referring to FIGS. 2–4, the capstan winch pulls the cable by continuously winding a couple of cable coils on and off the circumferential surface 30 of a narrow, flanged wheel or drum 32 as the wheel turns. The wheel is composed of a strong, lightweight material such as stainless steel or cast aluminum.

The wheel radius 31 is sized to produce a wheel curvature large enough to avoid bending the fiber optic cable beyond its bending limit, normally specified by the cable manufacturer as a minimum bending radius. The bending radius is often given as some multiple of the cable diameter. For example, a one-inch diameter cable having a bending radius of 10 can be wound on a wheel having a radius of at least 10 inches or a diameter of 20 inches. Interchangeable wheels with diameters of 18, 24, 30, and 36 inches are used to capstan cables of various common sizes.

A winch bracket 33 supports the wheel 32 so that it may turn in the desired manner. The winch bracket 33 includes a bracket base plate 34 to which a perpendicular upright plate 35 is welded and braced by gussets 37. A gearbox 36 is connected via mounting ears 38 and bolts 39 to the plate 35. Within the gearbox is a reducer gear train which drives a splined output shaft 40. The shaft extends through an aperture 42 in the plate 35 into an internally splined hub 46 of the wheel 32. The wheel is thus rotationally mounted to the shaft 40. An annular spacer 48 is fitted onto the shaft 40 between the hub 46 and a shoulder 47 of the shaft 40. The wheel is secured to the shaft 40 by an end cap 49 through which a threaded cap screw 50 extends axially into the shaft. Both spacer 48 and cap 49 are formed of a resilient, durable material such as nylon.

Corresponding to each wheel diameter is a different bracket 33, each having an upright plate 35 of a different height to maintain sufficient spacing between the wheel and the bracket base 34 for the cable to pass. Each bracket is sized to accommodate a different sized wheel yet maintain the lower rim of wheel 32 a predetermined distance from bracket base 34. Changing wheel size requires unbolting bolts 39 from ears 38 on gearbox 36 and removing wheel 32 by removing screw 50 and end cap 49. The procedure is reversed after insertion of the new bracket and wheel. Alternatively, a single bracket with several vertically spaced holes for adjustably mounting the gearbox 36 can be used with different diameter wheels.

The gearbox 36 and in turn the wheel 32 are driven by a high-speed, low-torque hydraulic motor 51 adjustably mounted on secondary bracket 52 bolted to a side of the gearbox 36 opposite the shaft 40. Bracket 52 is generally L-shaped in top view (FIG. 4) for mounting motor 51 with its output shaft 54 normal to gearbox output shaft 40. A sprocket 56 keyed to shaft 54 is aligned with a sprocket 57 keyed to a gearbox input shaft 59 extending from the side of the gearbox 36 and parallel to shaft 54. The two sprockets are operably connected by a chain 58, all enclosed within a protective housing 60, to transfer the power of the motor to the gearbox.

To maintain the desired pulling torque on the cable 12, the rotation rate of the wheel 32 is adjusted with respect to its diameter. Typically, it is desired that the wheel pull the cable between 45 and 200 feet per minute, depending upon the conduit resistance which must be overcome. If a larger diameter wheel is installed, sprockets 56, 57 are changed to reduce the wheel's rotation rate. Conversely, different sized sprockets are installed to increase the rotation rate for a smaller diameter wheel.

Referring to FIGS. 3 and 7, the hydraulic motor 51 has a female connector 61 and a male connector 64. The motor is connected thereby into the hydraulic drive circuit of FIG. 5 to receive hydraulic fluid from line 62 and to return the fluid to line 66. To shut off the flow of fluid to the motor 51, a two-position shutoff valve 72 is mounted atop the motor, shown in relation to the connectors 60, 64 in FIG. 3 and in the exploded view of FIG. 7. A plunger 73 of valve 72 is pushed down to block the flow of hydraulic fluid through line 66 to the motor and thereby stop the winch 10 from operating.

Atop motor bracket 52 is a lifting eye 75 for lifting the winch 10 into and out of the intermediate access points 15 (FIG. 1). Often these access points will be existing manholes having a diameter less than the diameter of the larger wheels used for pulling thicker fiber optic cable. To overcome this barrier, the wheel 32 can be cast with a removable pie-shaped wedge 77, shown in FIGS. 2 and 3, which is removed when the winch is put into or taken out of a manhole and then reattached by means such as bolts 79.

The Capstan Drive Arrangement

The capstan drive arrangement controls the pulling torque and rate of rotation of the capstan winch. FIG. 5 shows a schematic view of the capstan drive arrangement. It includes the hydraulic pump 19 which delivers hydraulic fluid under constant pressure and the controller 16 which controls the pressure and rate of flow of the fluid to the capstan winch.

Controller 16 appears in the center of the schematic (outlined in dotted lines) with the power unit 18 including hydraulic pump 19 and tank 81 depicted on the right and the capstan winch drive motor 51 of winch 10 shown on the left.

Referring to the pump 19, an output or high pressure line 80 connects the pump to inlet port 82 of the controller 16. The pressurized fluid is pumped through line 80 and into the controller at this port. A return line 84 connects to outlet port 86 of the controller to return fluid to the tank. Pump 19 is driven by conventional means (not shown).

Within the controller are several adjustable valves to regulate the flow speed and pressure of the hydraulic fluid to the capstan winch. Referring to FIGS. 5 and 6, the controller includes a speed control valve 76 which is adjustable to limit the flow of hydraulic fluid from the pump 19 to the motor 10. Valve 76 is positioned along internal line 88 which connects to inlet port 82. By adjusting handle 90, the operator can constrict or expand the throat of the valve and thereby control the flow of hydraulic fluid through line 88. The flow determines the rate at which wheel 32 rotates and hence the velocity at which the cable moves through the conduit.

To control the pressure of the fluid flow through valve 76 to the winch 10, a pressure control valve 96 selectively shunts a portion of the fluid back to the tank 81. Valve 96 connects to line 88 at a node 98 between valve 76 and the winch via check line 100. Through line 100, the pressure of the fluid delivered to the winch is also brought to bear on valve 96. When that pressure exceeds the adjusted bias on valve 96, the valve opens to shunt the fluid upstream of flow control valve 76 through a shunt line 104 connected to line 88 at a node 102. In this manner, less fluid is forced through valve 76 and the pressure of the fluid pumped to the winch 10 drops. The lower pressure and fluid flow to motor 51 decrease the pulling torque and speed, respectively, of the winch 10.

The pressure of the fluid in line 88 is measured (in pounds of pull) by a gauge 110. By monitoring the gauge, the operator can adjust the maximum pressure of the fluid powering the winch by turning a handle 112 on the pressure control valve 96 to cause the valve to open at the desired pressure and thereby limit the pulling torque of the winch to a tension below the damage threshold of the cable 12.

The controller also includes a manual three-position directional valve 120 for controlling the direction of the fluid flow into the winch 10 and for shutting off the flow entirely. In the neutral position shown in FIG. 5, fluid in line 88 is routed through valve 120 into return line 122 which connects to the outlet port 86. With the valve 120 shifted to its lower setting indicated by parallel arrows, the fluid flows through it and a port 123 in a forward direction to the winch motor 51 via connecting line 62. The fluid returns to the controller from the winch motor through line 66 to a port 130. From the port 130, the fluid flows through the valve 120 to internal return line 122. When shifted to its upper setting indicated by crossed arrows, the valve 120 directs the fluid in line 88 into line 66 to flow the opposite way through the winch motor and back to the controller through line 62 to return line 122. The change in flow direction changes the direction of rotation of wheel 32 and hence the direction of cable pull.

The shutoff valve 72 is located in line 66 between the winch motor 51 and port 130. The valve 72 on the winch motor and valve 120 on the controller allow the winch to be stopped at two different locations, that is, either at the power unit or in the manhole.

FIG. 6 shows a specific embodiment of the controller. Valve 76 is controlled by knob 90 from the top of enclosure 132. Gauge 110 is also located atop the enclosure for easy viewing. Pressure control valve 96 is accessible by its knob 112 extending from a side 134 of the enclosure. Directional valve 120 is controlled from the front of the enclosure by a lever 136.

Operation

Referring to FIG. 1, the capstan winches 10a, 10b (and any number of additional winches as needed) are placed at appropriate access points 15 along the conduit 14 spaced such that the tension necessary to pull the cable does not exceed the cable's tensional limit. The spacing varies with the acceptable pulling tension on the particular cable, normally specified by the cable manufacturer and typically around 600 pounds. The winches are set to pull at up to a predetermined maximum tension well below the limit, in the range of 200-300 pounds, to assure an adequate margin of safety. The distance between the access points 15a, 15b chosen depends in large part on the cable drag, which varies with the surface and linearity of the conduit. In practice, the capstan winches 10a, 10b have been placed more than 2,000 feet apart without the pulling tension reaching the cable tension limit.

To begin, each capstan winch 10 is lowered into the appropriate access point with the selected wheel oriented in the direction of cable pull. To pull the cable through a straight portion of the conduit, the wheel is oriented vertically, as shown in the drawings. However, by shifting the bracket 33, the wheel 32 can be oriented at any angle to pull the cable around a bend in the conduit. If a wheel with diameter larger than the diameter of the access point 15 is required, wedge 77 is removed and reattached once the winch is positioned within the manhole.

The pull begins by passing a pull rope, tape or wire (not shown) through each segment of conduit 14 from the entrance 24 to the exit 25. An end of the pull rope is connected to a lead end of cable 12 at the storage spool 22. The pull rope is wound several times around wheel 32 at each winch 10 and around bull wheel 25 and pulled taut.

The cable must be pulled from downstream with sufficient tension that the it frictionally engages the circumferential surface 30 of the preceding the drum or wheel 32 or upstream winch. If the tension on the cable at the point where it leaves the preceding winch 10a is too low, that wheel 32a will spin beneath the cable windings. To assure that the cable is sufficiently taut to frictionally engage the upstream winch drums, the pulling tension of the following winch 10b should be higher than that of the preceding winch or winches. In practice, the last downstream winch 10b is preferably set to pull with about 25 pounds of tension more than the upstream winches.

Before the actual cable pull begins, each winch is set by its respective controller 16 to pull the rope and attached cable 12 at a substantially uniform velocity and at a pulling tension within the predetermined tensional limit of the cable. This is done through the following steps. First, valve 72 is closed to shut off the flow of fluid to the winch 10. Second, valve 76 is opened fully. Third, pressure control valve 96 is adjusted to open fully against any pressure. Fourth, directional valve 120 is shifted to either the forward or reverse flow direction to block the return flow to the pump through line 122.

The fluid then bears against valve 96 through line 100 and the flow is shunted through line 104. Valve 96 is then adjusted to increase the bias necessary to open the valve until the necessary pressure rises to the desired maximum pulling pressure. This can be read from gauge 110.

Valve 72 is then opened to operate winch 10. To adjust the rate of rotation of the wheel 3 of the winch, valve 76 is adjusted to regulate the rate of fluid flow to the winch.

With operators at each winch and at the conduit entrance and exit in communication with each other, the winches are started. The pull rope is pulled through the conduit and taken up on the power take-up reel 28 which also provides tension to winch 26 or 10c. The cable, following the rope, is pulled off the spool 22, down and through the conduit entry 11. Within the conduit 14, the cable 12 is relayed by winch 10a to winch 10b to the conduit exit 13 and pulled out of the conduit by winch 26 or 10c.

The winches self-regulate their rate of wheel rotation and torque on the cable to maintain the predetermined velocity and pulling tension within limits. If a following or downstream winch 10b is pulling at a slower than the preceding winch 10a, slack will develop in the cable 12. Eventually, as the cable loosens its frictional engagement with the surface 30 of the preceding winch 10a, winch 10a ceases pulling the cable, although it continues turning the wheel 32. The slack is then picked up by the following winch 10b, which is still pulling, until the coil of cable tightens onto the wheel of the preceding winch 10a so that frictional contact is again made.

On the other hand, if winch 10b s pulling at a rate significantly greater than the winch 10a, ension on the cable increases at winch 10b t the cable tautens. Upon reaching the preset pressure limit, winch 10b stops pulling so as not to damage the cable 12. As more cable is provided by winch 10a, he tension on the cable slackens and winch 10b ill once again pull the cable. A workman observing this action can adjust the controller of winch 10b so that its pulling speed matches that of upstream winch 10a.

This self-regulation is facilitated by the operation of the controller 16. As the cable resistance in the conduit rises, a greater amount of fluid pressure is required to overcome it and turn the wheel 32. The resistance of the wheel 32 increases relative to the resistance of the speed control valve 76, causing the constant hydraulic pressure within the capstan drive arrangement to increase across the capstan winch 10 and decrease across the valve 76. The increased resistance overall decreases the flow rate and rotation rate of the wheel. When the pressure rises across the winch 10 to the bias setting of valve 96, the valve opens to shunt fluid away from the winch motor 51, effectively limiting the pressure to that setting. The winch 10 still turns but at the slower rate, stopping if the cable resistance increases further. If the cable resistance decreases because slack develops upstream, the fluid pressure across the winch decreases and valve 96 closes. The winch 10 then turns at a faster rate as the fluid flow rate increases through motor 51.

With this embodiment of the present invention, a continuous fiber optic cable over five miles in length has been laid without damage, and potentially greater lengths are possible.

In the embodiment illustrated, the cable is pulled until it reaches the surface of the exit 13 and before it winds around the conventional winch 26. But the method is not so limited. Alternatively, another capstan winch 10c could be mounted in place of the conventional winch 26 and act in combination with the bull wheel 25 to pull the cable out of the conduit and wind it onto an appropriately-sized take-up reel 28. This may be useful, for example, if an end portion of the cable is to be relayed into a tall building. Storing an end portion of pulled cable on the reel 28 avoids the need for a splice at the conduit exit. In another variation, the capstan winch could be driven by a direct-current electric motor through electrical circuitry analogous to controller 16 to provide control of pulling speed and torque.

Multiple Cable Capstan Winch

Figure 9:
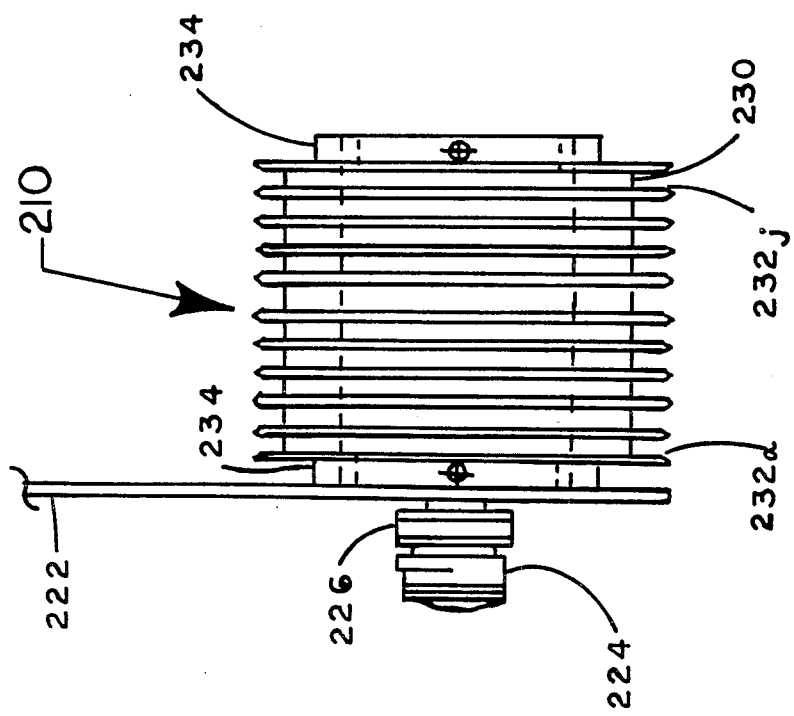
FIG. 9 is a side elevational view of the capstan winch of FIG. 8.
Figure 17:
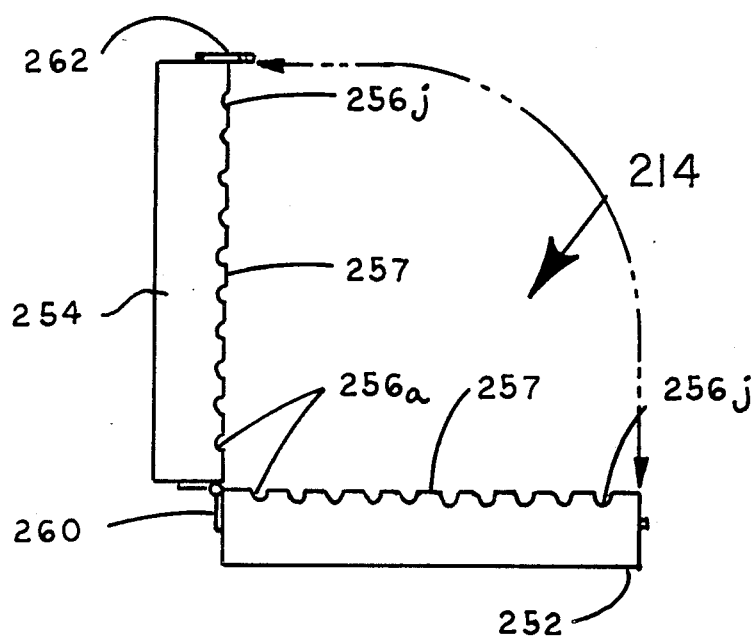
FIG. 17 is a side elevational view of a multiple cable guide as used in the apparatus of FIG. 15, shown in an opened position.

Referring generally to FIG. 15 and more particularly to FIGS. 9 and 17, a capstan winch 210 is positioned in a manhole 213 for pulling multiple runs of fiber optic cable 12 through conduit segments 214A, 214B. A pair of guide blocks 214A, 214B are positioned on opposite sides of the capstan winch 210. An outwardly curved flange or funnel structure 216 is mounted in the inlet and outlet of each duct to provide a smooth, rounded surface for the fiber optic cables to contact as they exit from and enter each segment of the conduit.

The arrangement of the apparatus shown in FIG. 15 is preferably contemplated to be used in the manner shown in FIG. 1. That is, the capstan winch 210 is positioned in a manhole with its periphery aligned tangentially with the incoming and outgoing segments of conduit. A controller and power pack similar to controller 16 and power pack 18 are used to power winch 210. Each cable is wrapped one or two times, depending on the pulling tension to be exerted on the cable, around each wheel. FIG. 16 shows an alternative arrangement in which a capstan 210 is mounted above the opening of manhole 213 and a bull wheel 218, having a structure similar to that of the winch of FIG. 9, is positioned in the manhole. In the arrangement of FIG. 15, the cable enters the manhole from conduit segment 14, passes through guide 214, wraps around capstan winch 210, passes through guide 214B and exits the manhole through conduit segment 216. In the arrangement shown in FIG. 16, the capstan winch 210 and bull wheel 220 are mounted on opposite ends of an elongated bracket 222. The guide blocks 214A, 214B are each mounted on arms 215 that extend in opposite directions transversely of bracket 222. Cable entering through conduit segment 216 passes through guide block 214A, wraps part way around bull wheel 220 and extends around winch 210 and back around the opposite side of the bull wheel 220 in a figure-b 8 fashion. The cable continues through guide 214B and exits through conduit segment 216B. A second wrap of the cable can be made around winch 210 if additional friction is needed to accommodate increased pulling tensions. The capstan winch wheels and bull wheels are sized, as described above, to a radius exceeding the minimum bending radius of the cable under tension. Such wheels can be similarly constructed as next described for the capstan winch.

FIGS. 8-14 show further details of the construction of the capstan winch 210. A hydraulic drive motor 224 is connected to a gear box 226 having an output drive shaft 227 extending through an opening 228 in bracket 222. The drive shaft is connected to drive a drum 230, being received in a splined axial drive shaft hole 231. A series of narrow, large diameter capstan wheels 230A through 232J are mounted on drum 230. An annular locking collar 234 is mounted on each end of the drum to secure the wheels thereon.

Figure 10:
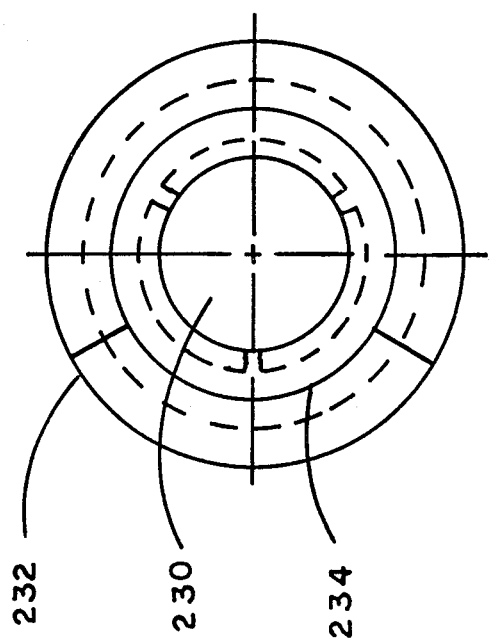
FIG. 10 is an axial end view of the capstan winch of FIG. 8.

As best seen in FIGS. 10 and 12, each wheel has a central, axially-extending cylindrical bore 36, sized to fit drum 230. Three keys or splines 238 are disposed equiangularly around opening 236. Each wheel is preferably formed in three equiangular segments 240A, 240B, 240C. These angular segments are interconnected by releasable means, such as bolts 79 in FIG. 2, so that the wheels can be disassembled for movement through a manhole opening that is smaller than the diameter of wheels 232. Key 238 is located in the same angular position in each wheel segment. Thus, all of the wheel segments can be identical. Each wheel has a pair of side flanges 242, 244, for retaining windings of fiber optic cable separately within each wheel. Each wheel has a width sufficient for one to two windings of common sizes of fiber optic cable. For example, a wheel having a two inch width circumferential surface 246 between flanges 242, 244, can accommodate a single winding of one inch fiber optic cable without binding. A suitable size of wheel for up to one inch fiber optic cable has a diameter at circumferential surface 246 of 32 inches. Two inch flanges, for a total wheel diameter of 36 inches, are used to assure that a loose cable will not jump from one wheel to another.

Figure 8:
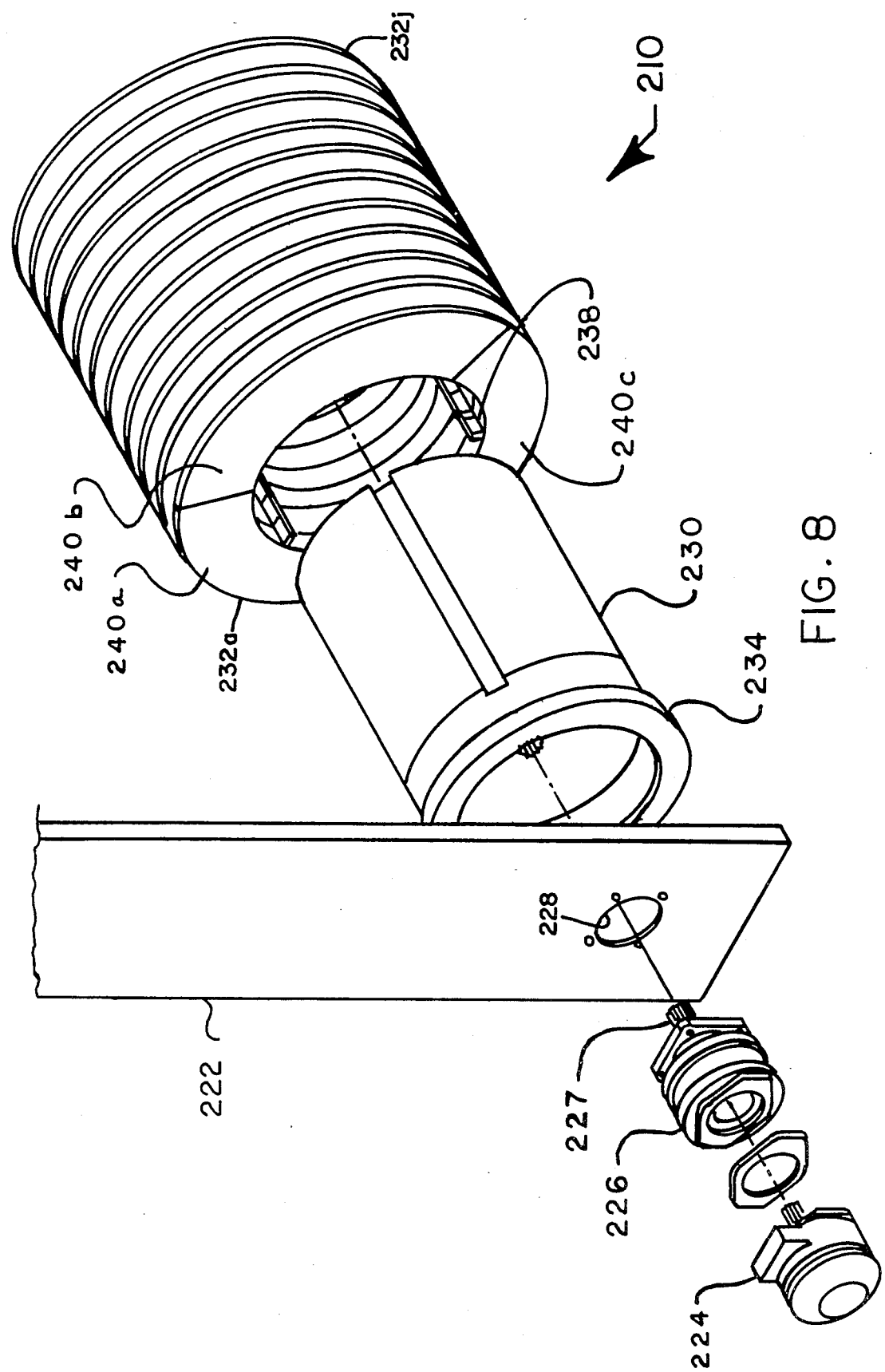
FIG. 8 is a perspective view of an alternative embodiment of a capstan winch according to the invention for pulling multiple runs of fiber optic cable.

Referring to FIGS. 8, 13, and 14, drum 230 is cylindrical and has three axially extending keyways 250 in its outer surface. These keyways are positioned equiangularly around the drum for receiving keys 238 of the wheels 232.

Figure 18:
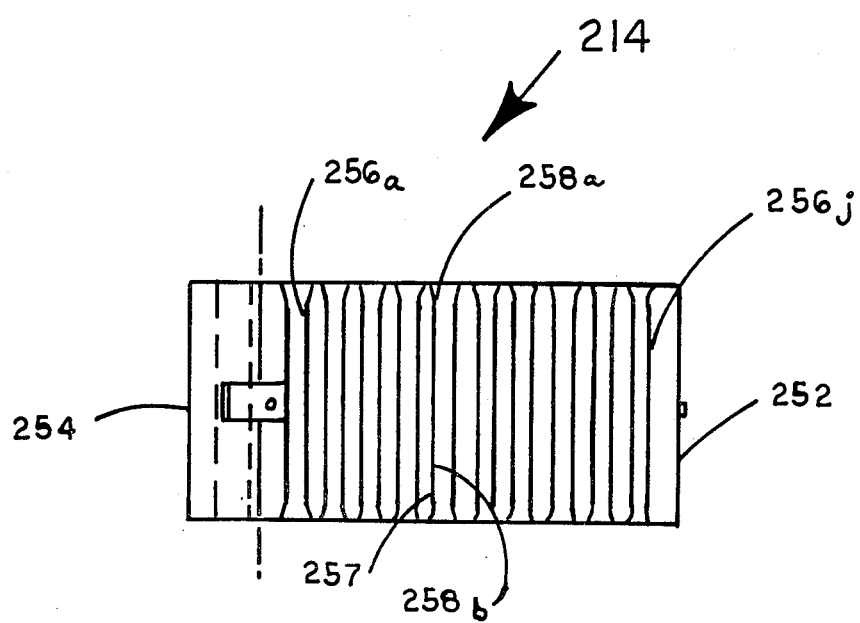
FIG. 18 is a top plan view of the guide of FIG. 17.

Referring to FIGS. 17 and 18, each guide block 214 is formed in two parts 252, 254. Each of these parts is a flat, rectangular member having a series of parallel semicircular grooves 256A through 256J formed on their mating surfaces. Each of these grooves has a diameter, for example, just over one inch, sufficient to allow cable of the largest size contemplated to be pulled to pass freely therethrough. Each groove has a tapered entry and exit 258A, 258B and the blocks 252, 254 are formed of a soft material such as wood, so that the cable can pass therethrough without damage. Fiber optic cable is conventionally lubricated so as to pass freely through the conduit, and this lubricant assists passage through the guides as well. Blocks 252, 254 are interconnected at one end by a hinge 260 and provided with a suitable lock or hasp 262 at the opposite end.

Figure 19:
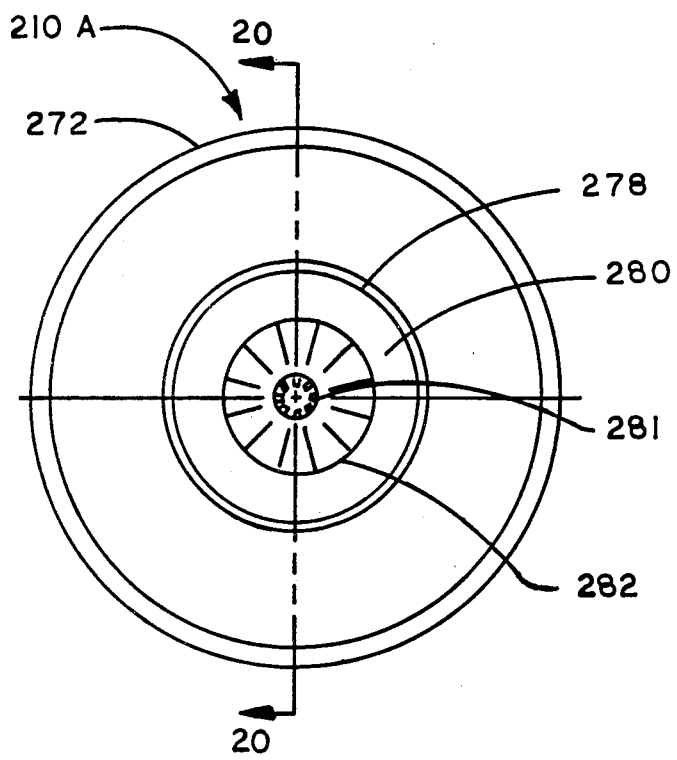
FIG. 19 is a axial end view of the second alternative embodiment of a capstan winch for pulling multiple runs of fiber optic cable, incorporating clutches so that the capstan wheels can turn independently under tension.
Figure 19:
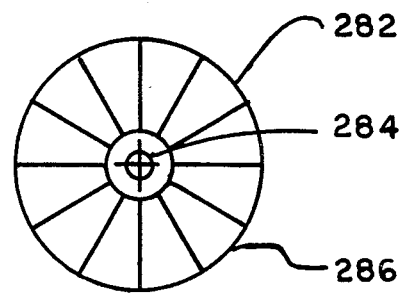
Figure 19:
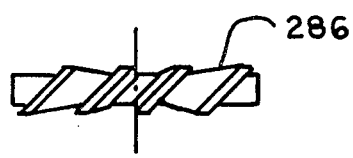
Figure 23:
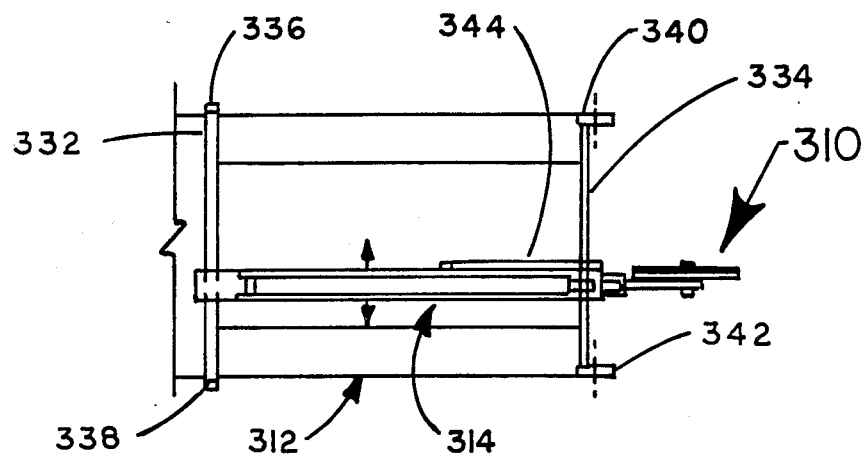
FIG. 23 is a top plan view of the apparatus of FIG. 22.

Next, referring to FIGS. 19 through 21, a capstan winch 210A for pulling multiple runs of fiber optic cable can be structured to include a clutch mechanism 270 which enables individual winch wheels to rotate at different speeds when the difference in tension on the cable exceeds a predetermined maximum. This feature comes into play when one of a number of cables hangs up in a section of conduit upstream of the capstan winch. The clutch assembly allows the wheel pulling the hung up cable to slip while the remaining wheels continue to pull their respective cables to prevent damage to the hung-up cable until the fact that it is hung up is detected and its cause is corrected.

Referring to FIGS. 19 and 20, each of the capstan wheels 272 is formed in a single piece with a smooth cylindrical central opening 274 for receiving a cylindrical shaft 276. The shaft and opening 274 are machined to a close fit such that the capstan wheel can be rotated more freely on the shaft. Each of the capstan wheels is provided on each axial side with a machine, annular clutch engagement surface 278.

A pair of annular clutch plates are mounted on opposite sides of each capstan wheel. The clutch plates have smooth inner surfaces for engaging surfaces 278 of the capstan wheels. The clutch plates have a splined axial opening 282 for rotatably engaging the complementary splined shaft 276.

The clutch is retained in frictional engagement with surface 278 by a spring 282 on each side of each capstan wheel. Referring to FIGS. 19A and 19B, the springs 282 have a generally annular shape with a cylindrical central opening 284 for receiving shaft 276. The spring is divided into equiangular radial segments 286. As shown in FIG. 19B, these segments are twisted to a normal position diagonal to a plane normal to the axis of opening 284. When compressed in an axial direction, the compression forces tend to flaten and slightly bend the radial segments to exert a spring force against the clutch plates. Alternatively, the radial segments can be bent so that the spring 282 has a generally concave-convex shape. As shown in FIG. 21, the springs are compressed against the clutch plates and retained in a compressed condition by a pin received through an opening 288 extending through a diameter of shaft 276. Alternatively, an annular groove can be formed in the shaft and a snap ring substituted for the pin (not shown).

The frictional engagement force of the clutch against the capstan wheel can vary, depending upon the spring tension applied by spring 82. This spring tension is in turn varied by the choice of materials used to form the spring and the pitch of the radial segments 286.

Extensible Boom-Mounted Capstan Winch

Referring to FIGS. 22 through 25, a capstan winch 310 for pulling fiber optic cable can be mounted on a surface truck 312 by means of an extensible boom 314. The capstan winch 310 is generally similar in structure and operation to capstan winch 10, described above, except that the previously-described mounting bracket is omitted and the capstan winch is mounted, instead, on the boom 314 as further described below. The service truck is a conventional vehicle of a type commonly used by the telecommunications operating companies.

Extensible boom 314 comprises a tubular sleeve 316, a cylindrical extension member 318 slidably received in sleeve 316 and a hydraulic ram 320. A hydraulic ram is connected at a head end 322 to an upper for forward end of sleeve 316 and has an extensible rod 324 connected to a lower or rearward end of extension member 318. Although shown externally, the hydraulic ram can, alternatively, be mounted internally of sleeve 316, inside extension member 318. The capstan winch 10 is mounted on the end of extensible member 318 by means of an elongate bracket member 326, further described hereinafter.

The extensible boom 314 is mounted on a rack atop a rear portion of service truck 312. The rack is formed by a pair of horizontal members 330, 332 mounted atop the forward and rearward ends of the service truck rear portion, and positioned transversely of the direction of travel of the service truck. Front member 332 is supported by vertical posts 336, 338 connected to opposite sides of the forward end of the rear portion of the service truck. Rear horizontal member 334 is similarly connected to posts 340, 342 mounted on the rear corners of the service truck. The upper end of boom 316 rests on the forward horizontal rack member 332 and can be secured thereto during travel but is releasable to allow the boom to pivot to an upright position about horizontal member 334.

Figure 22:
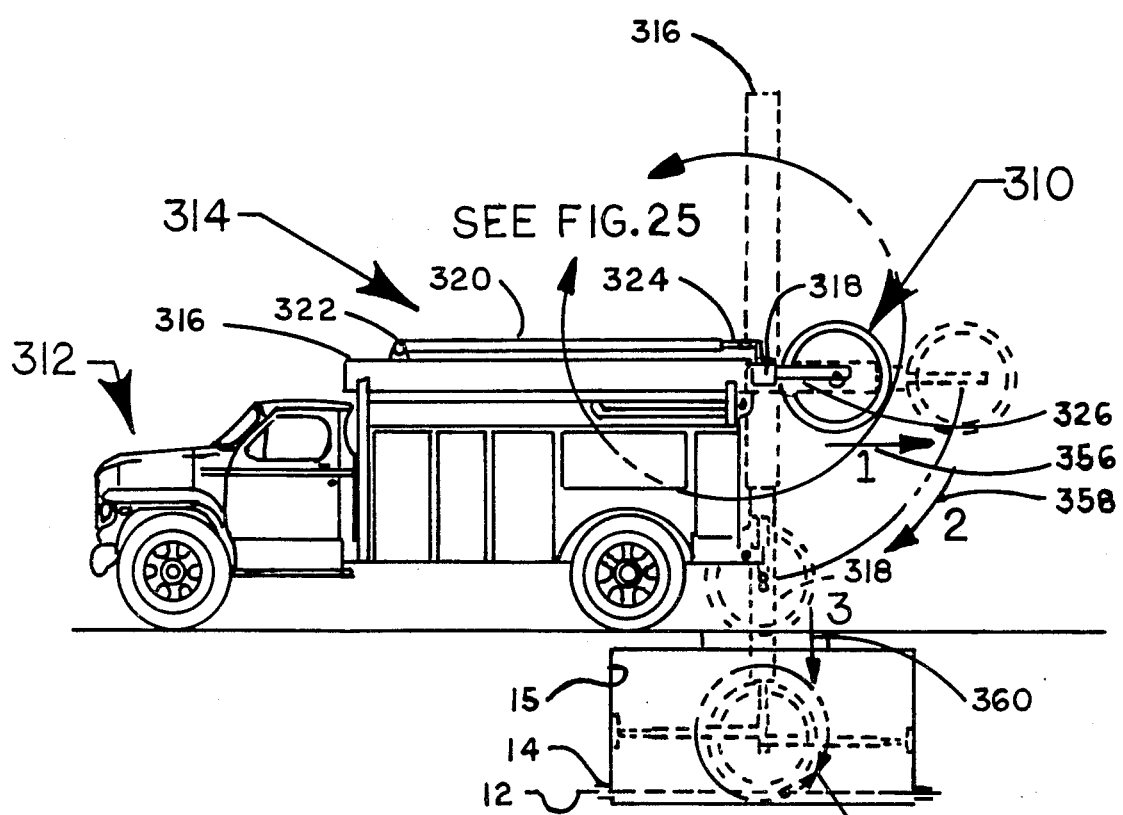
FIG. 22 is a side elevational view of an extensible-boom-mounted capstan winch in accordance with the invention.
Figure 25:
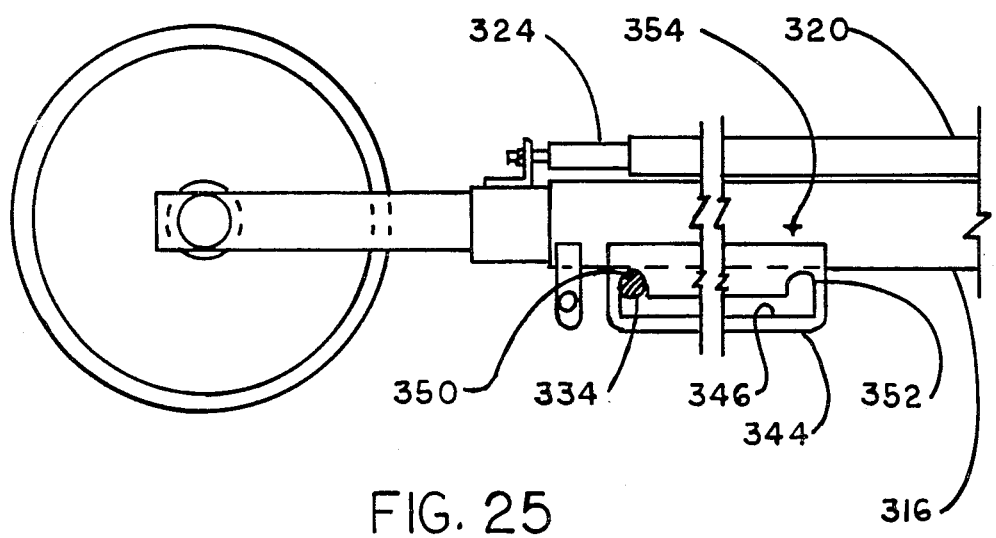
FIG. 25 is an enlarged view of a portion of the apparatus shown in FIG. 22, as seen from the opposite side, showing the slidable boom mount atop a service truck.

Referring to FIG. 25, a bracket 344 is mounted on the rearward end of sleeve 316, which bracket is slidable in the direction of travel of the vehicle on horizontal member 334 between a rest position as shown in solid lines in FIG. 22 and a vertical, working position as shown in dashed lines. This bracket forms an elongate U-shaped slot 346 formed by a horizontal portion 348 and rearward and forward offset portions 350, 352. In these offset portions extend upwardly a short distance, approximately equal to the diameter of cross member 334 from elongate portion 348. When boom 314 is in a resting position atop the service truck, back member 334 is received in rear slot portion 350. Bracket 344 is long enough that its forward end portion 352 is positioned close to the center of gravity of the boom, designated by reference numeral 354. To shift the boom to a vertical, working position, its rear end is raised sufficiently for slot portion 350 to clear frame member 334 and allow the boom to slide rearwardly along elongate portion 348 of slot 346 to end portion 352, sliding the boom in the direction indicated by arrow 356 in FIG. 22. Then, the rearward end of the boom is swung downward, in the direction of arrow 358, with slot portion 352 pivoting about horizontal back member 334. Next, by operating hydraulic ram 320 (powered by a conventional hydraulic power source and valves) the capstan which is lowered into a manhole by extending extensible portion 318, as indicated by arrow 316.

Figure 24:
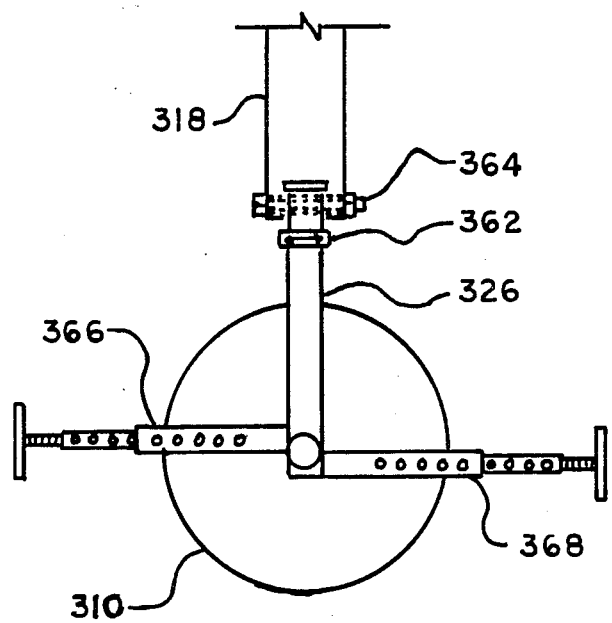
FIG. 24 is an enlarged view of a portion of FIG. 22, showing the tiltable, swivelable connection of the capstan to the extensible boom.

Referring to FIG. 24, capstan winch 310 is mounted on elongate mounting member 326, which is connected to extensible member 318 as next described. First, its member 326 has a swivel 362 which enables the capstan wheel to be rotated about a vertical axis for alignment angularly with an underground conduit. Second, member 326 is connected above swivel 362 to the extensible member 318 by means of a horizontal pivot pin 364. This pivot pin is oriented once the capstan winch is lowered into the manhole, a pair of extension legs 366, 368 are mounted on the lower end of member 326 for raising the capstan winch against the walls of the manhole. In many situations, it will be sufficient to use only one extension leg, positioned on the upstream side of the capstan winch to resist the pulling tension of the capstan against the cable.

Having illustrated and described the principles of my invention in a preferred embodiment thereof, it should be readily apparent to those skilled in the art that the invention can be modified in arrangement and detail without departing from such principles. Although the above embodiment of the invention pertains to the pulling of cable through underground conduit, the invention may be used to pull cable aerially as well. I claim all modifications coming within the spirit and scope of the accompanying claims.

I claim:

1. A capstan winch for pulling multiple runs of fiber optic cable having a minimum bending radius and a maximum tensional limit, comprising:
   a capstan wheel means having a radius no less than a predetermined minimum bending radius of the cable for the cable to be wound around it;
   mounting means for mounting the wheel means to rotate;
   rotating means for rotating the wheel means to pull and wind the cable onto the wheel means and relay the cable onward; and
   means for controlling the rotating means so as to apply to the cable a predetermined maximum tension not to exceed a tensional limit of the cable;
   the capstan wheel means comprising a plurality of capstan wheels mounted on a common shaft driven by the rotating means, each wheel having a circumferential surface for engaging the cable and a circumferential flange for retaining the cable on the circumferential surface, the surface having a width axially of the wheel sufficient for at least one complete winding of the cable to be made around the wheel;
   the mounting means comprising a bracket supporting the rotating means on one side and the capstan wheel means on the other side, the shaft extending through the bracket between the rotating means and the capstan wheel means and having a free end opposite the rotating means so that loops of fiber optic cables can be uncoiled from the capstan wheel means without cutting the cables.

2. A capstan winch for pulling multiple runs of fiber optic cable having a minimum bending radius and a maximum tensional limit, comprising:
   a capstan wheel means having a radius no less than a predetermined minimum bending radius of the cable for the cable to be wound around it;
   mounting means for mounting the wheel means to rotate;
   rotating means for rotating the wheel means to pull and wind the cable onto the wheel means and relay the cable onward; and
   means for controlling the rotating means so as to apply to the cable a predetermined maximum tension not to exceed a tensional limit of the cable;
   the capstan wheel means comprising a plurality of capstan wheels, each having a circumferential surface for engaging the cable and a circumferential flange for retaining the cable on the circumferential surface, the surface having a width axially of the wheel sufficient for at least one complete winding of the cable to be made around the wheel and each wheel being formed in at least two equiangular segments, said segments being detachable so that the wheel can be disassembled to pass through an opening of diameter smaller than the diameter of the wheel.

3. A capstan winch according to claim 1 in which the capstan wheel means comprises a cylindrical drum defining said common shaft, the wheels each comprise an annular wheel member having a central, axial opening sized to fit on the drum, and complementary key means for mounting the wheels on the drum slidably in an axial direction and interconnecting the drum and wheels for rotation.

4. A capstan winch for pulling multiple runs of fiber optic cable having a minimum bending radius and a maximum tensional limit, comprising:
   a capstan wheel means having a radius no less than a predetermined minimum bending radius of the cable for the cable to be wound around it;
   mounting means for mounting the wheel means to rotate;
   rotating means for rotating the wheel means to pull and wind the cable onto the wheel means and relay the cable onward;
   means for controlling the rotating means so as to apply to the cable a predetermined maximum tension not to exceed a tensional limit of the cable; and
   guide means positioned adjacent the circumferential surface of the wheels for spacing multiple fiber optic cables a predetermined distance apart axially along the capstan wheel means, at a spacing corresponding to the spacing of the wheels;
   the capstan wheel means comprising a plurality of capstan wheels, each having a circumferential surface for engaging the cable and a circumferential flange for retaining the cable on the circumferential surface, the surface having a width axially of the wheel sufficient for at least one complete winding of the cable to be made around the wheel;
   the guide means including a pair of blocks positionable to contact one another along a dividing plane and having a series of parallel semicircular grooves positioned to form a series of parallel cylindrical guideways when the blocks are mated together, and means for securing the blocks together with multiple runs of cable positioned in the guideways;
   the guiding means inluding an arm pivotally connected to the mounting means for positioning the guiding means at a predetermined spacing from the wheels to guide the cables along a path substantially tangential to the circumferential surface of the capstan winch wheels.

5. A capstan winch according to claim 1 including a clutch means associated with each capstan wheel for releasably engaging the capstan wheels with the rotating means so that an individual wheel disengages from rotation when tension on the cable wound around the individual wheel exceeds a predetermined maximum tension for a single cable.

6. A capstan winch according to claim 5 in which the capstan wheel means comprises a cylindrical shaft defining said common shaft, the wheels each comprise an annular wheel member having a central, axial opening sized to fit on the shaft and rotate freely thereon, and the clutch means includes interconnecting the shaft and clutch means for rotation together.

7. A capstan winch according to claim 6 in which the clutch means includes an annular clutch plate frictionally engaging an axial face of the wheel and annular spring means received on the shaft for resiliently urging the clutch plate into frictional engagement with the clutch plate.

8. A capstan winch for pulling multiple runs of fiber optic cable having a minimum bending radius and a maximum tensional limit, comprising:
   a capstan wheel means having a radius no less than a predetermined minimum bending radius of the cable for the cable to be wound around it;
   mounting means for mounting the wheel means to rotate;
   rotating means for rotating the wheel means to pull and wind the cable onto the wheel means and relay the cable onward; and
   means for controlling the rotating means so as to apply to the cable a predetermined maximum tension not to exceed a tensional limit of the cable;
   the capstan wheel means comprising a capstan wheel mounted to a shaft driven by the rotating means, the wheel having a circumferential surface for engaging the cable and a circumferential flange for retaining the cable on the circumferential surface, the surface having a width axially of the wheel sufficient for at least one complete winding of the cable to be made around the wheel; and
   boom means connected to the mounting means for supporting capstan wheel means and rotating means;
   the boom means being mounted on a vehicle and being operable to raise and lower the capstan wheel means and rotating means as a unit for positioning same in an underground access opening;
   the mounting means comprising a bracket supporting the rotating means on one side and the capstan wheel means on the other side, the shaft extending through the bracket between the rotating means and the capstan wheel means and having a free end opposite the rotating means so that a loop of fiber optic cable can be uncoiled from the capstan wheel means without cutting the cable.

9. A capstan winch according to claim 8 in which the boom means includes a downwardly extensible member and swivel means connecting the mounting means for rotatable movement about a vertical axis.

10. A capstan winch according to claim 8 in which the boom means includes a downwardly extensible member and tiltable connection means connecting the mounting means for swingable movement of the capstan wheel means about a horizontal axis normal to the rotational axis of the wheel.

11. A capstan winch according to claim 8 in which the member, elongate sleeve means for telescoping supporting the extensible member; and means for tiltably mounting the sleeve means on the vehicle for movement between an upright position, for lowering the capstan wheel means and rotating means, and a reclining position for transporting the capstan winch.

12. A capstan winch according to claim 11 in which the tiltable mounting means includes means for shifting the boom means lengthwise about a pivot to shift its center of gravity.

13. A capstan winch according to claim 11 in which the tiltable mounting means includes means for shifting the boom means widthwise for positioning the capstan winch laterally of the access opening.

14. A capstan winch according to claim 8 in which the wheel is formed in at least two equiangular segments, said segments being detachable so that the wheel can be disassembled to pass through an opening of diameter smaller than the diameter of the wheel.

* * * * *